(12) United States Patent
Carlton

(10) Patent No.: US 6,226,937 B1
(45) Date of Patent: *May 8, 2001

(54) FOOTING CONNECTOR

(76) Inventor: Douglas C. Carlton, 1115 Heatherwood, Flint, MI (US) 48532

( * ) Notice: Subject to any disclaimer, the term of this patent is extended or adjusted under 35 U.S.C. 154(b) by 0 days.

This patent is subject to a terminal disclaimer.

(21) Appl. No.: 08/977,430

(22) Filed: Nov. 24, 1997

Related U.S. Application Data

(63) Continuation-in-part of application No. 08/526,750, filed on Sep. 11, 1995, now Pat. No. 5,689,921, which is a continuation-in-part of application No. 08/216,150, filed on Mar. 22, 1994, now Pat. No. 5,560,163, which is a continuation-in-part of application No. 08/198,515, filed on Feb. 18, 1994, now Pat. No. 5,634,311.

(51) Int. Cl.$^7$ .................................................. E04G 15/06
(52) U.S. Cl. .......................... 52/169.5; 52/98; 52/220.8; 52/302.1; 285/901; 285/903
(58) Field of Search ......................... 52/169.5, 98, 220.8, 52/302.1; 285/901, 903

(56) References Cited

U.S. PATENT DOCUMENTS

| | | |
|---|---|---|
| 947,185 | 1/1910 | McBean . |
| 1,603,245 | 10/1926 | Pederson . |
| 1,864,861 | 6/1932 | Schaller . |
| 2,707,117 | 4/1955 | Fentress et al. . |
| 2,758,612 | 8/1956 | Zaleski . |
| 2,818,636 | 1/1958 | Fentress et al. . |
| 2,893,432 | 7/1959 | Bowditch . |
| 3,318,336 | 5/1967 | Treiber . |
| 3,486,771 | 12/1969 | Conlin . |
| 3,669,473 | 6/1972 | Martin et al. . |
| 3,695,643 | 10/1972 | Schmunk . |
| 3,711,633 | 1/1973 | Ghirardi et al. . |
| 3,727,953 | 4/1973 | Martin et al. . |
| 3,825,288 | 7/1974 | Maroschak . |
| 3,895,177 | 7/1975 | Muslin . |
| 3,897,090 | 7/1975 | Meroschak . |
| 4,071,265 | 1/1978 | Wallace . |
| 4,132,264 | 1/1979 | Furlong . |
| 4,274,455 | 6/1981 | Simons . |
| 4,279,190 | 7/1981 | Hummel . |
| 4,453,354 | 6/1984 | Harbeke . |
| 4,488,388 | 12/1984 | Schmidt . |
| 4,688,833 | 8/1987 | Todd . |
| 4,817,348 | 4/1989 | Wydra . |
| 4,915,020 | 4/1990 | Dumbeck . |
| 4,938,124 | 7/1990 | Garza . |
| 5,083,500 | 1/1992 | Francis et al. . |
| 5,104,150 | 4/1992 | Bard et al. . |
| 5,107,648 | 4/1992 | Roby . |
| 5,158,501 | 10/1992 | Proskiw . |

*Primary Examiner*—Christopher T. Kent
(74) *Attorney, Agent, or Firm*—Plunkett & Cooney; Arnold Weintraub

(57) ABSTRACT

A footing connector has a first hollow leg and a second hollow leg integral therewith. The interiors of the two hollow legs are in fluid communication. The two legs cooperate to form, preferably, a T-shaped connector. The first leg has threading thereon, and, preferably, the second leg has threading thereon and protruberances therein, to enable connection to other elements of a drainage system. The second hollow leg may have end caps integral therewith at the ends thereof. The connector is used in a drainage network to drain water away from the outside of a building and to evacuate unwanted gasses from the inside of a building.

8 Claims, 1 Drawing Sheet

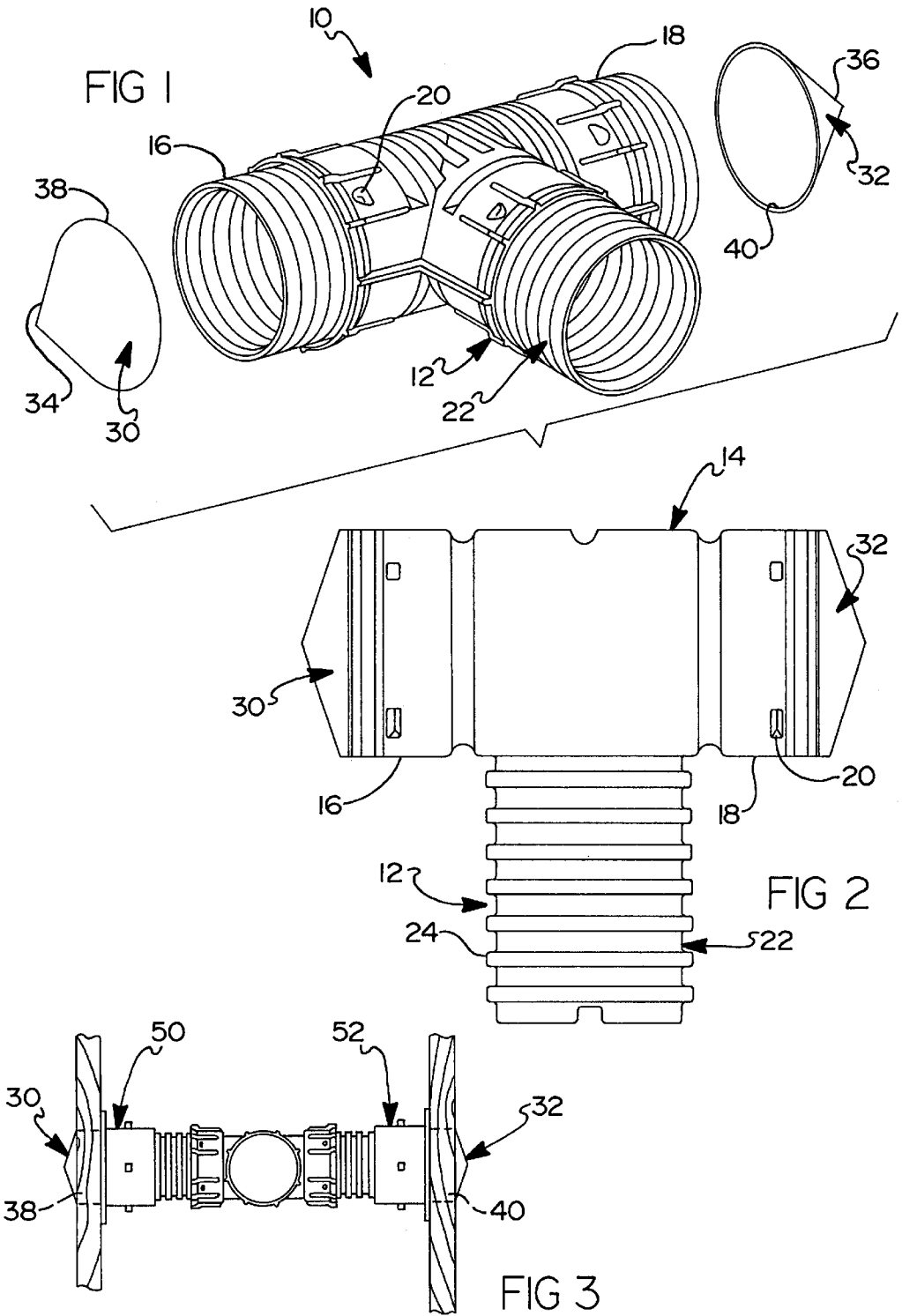

FOOTING CONNECTOR

CROSS-REFERENCE TO RELATED APPLICATIONS

This application is a continuation-in-part application of U.S. patent application Ser. No. 08/526,750 ('750), entitled "FOOTING CONNECTOR AND METHOD OF USE", filed Sep. 11, 1995, now U.S. Pat. No. 5,689,921 ('921), which is a continuation-in-part application of U.S. patent application Ser. No. 08/216,150, now U.S. Pat. No. 5,560,163 ('163), entitled "DRAINAGE CONNECTOR AND DEVICE TO CONNECT DRAINAGE CONNECTOR", filed Mar. 22, 1994, which is, in turn, a continuation-in-part application of U.S. patent application Ser. No. 08/198,515, now U.S. Pat. No. 5,634,311 ('311), entitled "DRAINAGE CONDUIT", filed Feb. 18, 1994, the disclosures of which are incorporated herein by reference.

BACKGROUND OF THE INVENTION

1. Field of the Invention

The present invention relates to drainage conduit connectors for buildings. More particularly, the present invention concerns such conduit connectors and a method for utilizing such connectors.

2. Prior Art

In the '163 and '311 patents incorporated by reference, there is disclosed and taught a collar for use with footings which prevents the collapse and closure of the ends of the drain conduit and a connector for interconnecting multiple drain conduits. While the inventions disclosed therein are efficacious, it is to be appreciated that there is no ready facility for preventing cement from entering the connectors or conduit at the outside of the form. Many times, as cement is poured, it falls outside the form and spills into the conduit, thereby preventing water from flowing therethrough.

It is to the solution of the above-mentioned problems that the present invention is directed.

BRIEF SUMMARY OF THE INVENTION

In accordance with the present invention there is provided a connector for use with a collar and tubing in forming a footing, the connector comprising:

(a) a first leg, the first leg having a hollow interior, the first leg having a first end and an opposed second end, the first leg having a thread formed thereon, and (b) a second leg, the second leg integral with the first leg at the first end thereof, the second leg having a hollow interior, the interior of the second leg and the interior of the first leg in fluid communication.

The first hollow leg has a thread formed thereon to enable connection with other elements of a footing network. The second leg has protruberances formed therein to enable connection with other elements of a footing network.

At least one end cap is disposed on the second leg. Preferably, two end caps are disposed on the second leg, one end cap at each end of the second leg. The end caps prevent water from seeping into the connector. Similarly, an end portion is disposed at the end of the first leg away from the second leg. The end portion prevents water from seeping into the connector.

The second leg, preferably, has at least one thread formed thereon proximate the at least one end cap, again to enable connection with other elements of a footing network.

Prior to placement of the connector, one or more of the end caps and/or the end portion may be removed from the leg(s). Removal of the end caps and/or the end portion may be accomplished by cutting, such as by sawing or the like, or other similarly well-known methods. The end caps and the end portion fit into the open ends of the collars disclosed in the '163 and '311 patents. When emplaced, the end caps and the end portion preclude entry of cement into the collars, tubing, and connectors at the outside of the form.

The connector may be T-shaped, Y-shaped, or cross-shaped depending upon its placement in the footing, and the configuration of the network to be formed. The connectors, collars, and corrugated tubing form a network that may function to drain water from about the periphery of a building and concomitantly to evacuate unwanted gasses from within the building.

For a more complete understanding of the present invention, reference is made to the following detailed description and accompanying drawing. In the drawing, like reference characters refer to like parts throughout the several views, in which:

BRIEF DESCRIPTION OF THE SEVERAL VIEWS OF THE DRAWING

FIG. 1 is an exploded perspective view of a preferred footing connector according to the present invention;

FIG. 2 is a plan view of the footing connector of FIG. 1; and

FIG. 3 is a top plan view of the footing connector of FIG. 1 in use with the end caps covering the collars leading to the outside of the form.

DETAILED DESCRIPTION OF THE INVENTION

With reference to the drawing and, in particular, FIGS. 1 and 2, there is depicted therein a footing connector in accordance with the present invention and denoted, generally, at 10. The connector 10 is, preferably, a T-shaped connector, although other configurations can be used, such as a Y-shaped connector or a cross-shaped connector.

As shown, the connector 10 hereof comprises a first leg 12 and a second leg 14 integrally formed with the first leg, the first leg 12 and the second leg 14 being, preferably, substantially normal. Each of the first leg 12 and the second leg 14 has a hollow interior. The interiors of the first leg 12 and the second leg 14 are in fluid communication with each other.

The first leg 12 has a first end 42 and a second end 44 opposed to the first end. The first leg 12 is integrally formed with the second leg 14 at the first end 42 of the first leg 12. The second end 44 of the first leg 12 has an aperture 46 formed therethrough. Preferably, the first leg 12 has a reduced-diameter end portion 48 integrally formed therewith at the second end 44 thereof. Preferably, the end portion 48 has a hollow interior. The hollow interior of the end portion 48 is in fluid communication with the hollow interior of the first leg 12. The end portion 48 may be removed by cutting, such as with a knife, saw, or the like, to enable the leg to engage a collar or tubing, as discussed herein.

Preferably, the first leg 12 has a threaded portion 22 having an exterior thread 24 formed thereon to enable the connector 10 to threadably engage a collar or tubing via protruberances on the collar or tubing, as discussed herein.

The second leg 14 is defined by arms 16, 18. At least the second leg 14 has protruberances 20 formed therein to enable threaded connection with a connecting section of conduit or a collar, as discussed herein.

The arms 16, 18 of the second leg 14 each include an end cap 30, 32, respectively, integrally formed at the terminus thereof. The end caps 30, 32 may be removed by cutting, such as with a knife, saw, or the like, to enable the leg to engage a collar or tubing, as discussed herein.

As depicted in FIG. 1, each end cap 30, 32 has a closed distal end 34, 36, respectively, and an open proximal end 38, 40, respectively. With the end caps 30, 32 removed, the arms 16, 18 of the second leg 14 join in any convenient manner to another connector, a collar, or a length of tubing to enable formation of a routing network of channels to direct both moisture and gasses to a desired location, as disclosed in the co-pending applications.

Each of the arms 16, 18, preferably, has a threaded portion 17, 19, respectively, having an exterior thread 17', 19', respectively, formed thereon proximate the end caps. The threaded portions 17, 19 enable attachment of the connector to another connector, a collar, or a length of tubing to enable formation of a routing network.

In use, and as depicted in FIG. 3, the end caps 30, 32 are configured to be employed with collars 50, 52 such as those disclosed in the '163 and '311 patents included herein by reference. The proximal ends 38, 40 of each end cap 30, 32 engages the collars 50, 52, respectively. By placing the caps 30, 32 outside the footing form and inserting their proximal ends 38, 40 into corresponding collars, cement which might accidentally spill at the outside of the footing form is precluded from entering the interior of the collar and the connector. Additionally, the caps 30, 32 prevent cement from seeping between the collar and the footing form when the collar is mounted to the inside of the footing form, as taught in the co-pending applications. This ensures the operability of the drain network.

The present invention provides a much improved connector, for several reasons. The present invention provides a connector that drains water away from the outside of a building. Additionally, the connector of the present invention provides end caps for preventing the spillage of cement into the footing network.

While the invention has been illustrated and described in the drawings and the foregoing description, the same is to be considered illustrative and not restrictive in character, it being understood that only the preferred embodiments have been shown and described fully and that all changes and modifications that come within the scope of the invention are desired to be protected.

Having, thus, described the system, what is claimed is:

1. A connector for use with a collar and tubing in forming a footing, the connector comprising:

(a) a first leg, the first leg having a hollow interior, the first leg having a first end and an opposed second end, the first leg having a thread formed thereon, and (b) a second leg, the second leg integral with the first leg at the first end thereof, the second leg having a hollow interior, the interior of the second leg and the interior of the first leg in fluid communication, the second leg having a first end and an opposed second end, (c) at least one end cap integrally formed on and contiguous with the second leg at one end thereof, the at least one end cap projecting outwardly from the second leg.

2. The connector of claim 1 wherein the second leg is substantially normal to the first leg.

3. The connector of claim 2 wherein the first leg and the second leg cooperate to define a T-shaped connector.

4. The connector of claim 1 further comprising a reduced-diameter end portion integral with the first leg at the second end thereof, the end portion having a hollow interior, the interior of the end portion in fluid communication with the interior of the first leg.

5. The connector of claim 1 wherein the at least one end cap is configured to removably nest within a collar.

6. The connector of claim 1 wherein the second leg has at least one thread formed thereon proximate the at least one end cap.

7. The connector of claim 1 wherein the second leg has a first end and an opposed second end, and further comprising two end caps, one of the end caps disposed at the first end of the second leg and the other of the end caps disposed at the second end of the second leg, each of the end caps integrally formed on and contiguous with an associated end of the second leg, each of the end caps projecting outwardly from the second leg.

8. The connector of claim 1 further comprising at least one protruberance projecting into the second leg.

\* \* \* \* \*